(12) United States Patent
McKinnon

(10) Patent No.: US 7,025,367 B2
(45) Date of Patent: Apr. 11, 2006

(54) ADJUSTABLE AIR CUSHION BICYCLE SEAT

(76) Inventor: Paul G. McKinnon, 807 West Forest, Brigham City, UT (US) 84302

( * ) Notice: Subject to any disclaimer, the term of this patent is extended or adjusted under 35 U.S.C. 154(b) by 115 days.

(21) Appl. No.: 10/681,839

(22) Filed: Oct. 8, 2003

(65) Prior Publication Data

US 2004/0070168 A1 Apr. 15, 2004

Related U.S. Application Data

(60) Provisional application No. 60/416,822, filed on Oct. 8, 2002.

(51) Int. Cl.
*B62J 1/02* (2006.01)
(52) U.S. Cl. .................... 280/288.4; 267/132
(58) Field of Classification Search ............. 297/195.1, 297/215.13, 344.16, 344.12; 280/281.1, 280/288.4; 267/132, 120, 64.17, 64.18, 64.22; 248/161
See application file for complete search history.

(56) References Cited

U.S. PATENT DOCUMENTS

| | | | | |
|---|---|---|---|---|
| 598,186 A * | 2/1898 | Thompson | ................... | 280/283 |
| 3,179,369 A * | 4/1965 | Hale | .......................... | 248/404 |
| 3,339,873 A | 9/1967 | Hale | .......................... | 248/404 |
| 3,396,045 A * | 8/1968 | Bysath | ....................... | 106/243 |
| 3,472,285 A * | 10/1969 | Ginsburgh et al. | ............ | 138/97 |
| 3,636,816 A | 1/1972 | Hale | ............................ | 91/4 R |
| 3,703,069 A * | 11/1972 | Wheeler, Jr. | .................. | 55/337 |
| 3,712,429 A | 1/1973 | Otto | ............................. | 188/300 |
| 3,756,654 A | 9/1973 | Bauer | ..................... | 297/344.19 |
| 3,861,740 A * | 1/1975 | Tajima et al. | ............ | 297/215.13 |
| 3,936,039 A * | 2/1976 | McKinnon | .................... | 267/34 |
| 4,074,887 A * | 2/1978 | Hale | ............................ | 248/404 |
| 4,369,820 A * | 1/1983 | Ahlers et al. | .................. | 141/39 |
| 4,746,106 A * | 5/1988 | Fukumura | .................... | 267/218 |
| 4,872,696 A * | 10/1989 | Gill | ............................. | 280/281.1 |
| 5,094,424 A | 3/1992 | Hartway | ....................... | 248/600 |
| 5,236,170 A * | 8/1993 | Johnsen | ....................... | 248/578 |
| 5,301,974 A * | 4/1994 | Knapp | ......................... | 280/283 |
| 5,324,058 A | 6/1994 | Massaro | ....................... | 280/283 |
| 5,383,705 A | 1/1995 | Voigt | ........................... | 297/211 |
| 5,713,555 A * | 2/1998 | Zurfluh et al. | .............. | 248/599 |
| 5,797,594 A * | 8/1998 | Sekine et al. | ............. | 267/64.17 |
| 5,826,935 A | 10/1998 | DeFreitas | ............... | 297/215.13 |
| 5,829,733 A | 11/1998 | Becker | ......................... | 248/631 |
| 6,217,010 B1 * | 4/2001 | McNeely | .................. | 267/64.16 |

* cited by examiner

*Primary Examiner*—Lesley D. Morris
*Assistant Examiner*—Daniel Yeagley
(74) *Attorney, Agent, or Firm*—Marcus G. Theodore

(57) ABSTRACT

An adjustable air cushion bicycle seat hydraulic ram system mounted within the seat post of a bicycle with one end of the ram attached to the bicycle seat, and the other end of the ram in communication with an internal reservoir associated with an adjustable pressurized air/oil reservoir to selectively fill the internal reservoir with a pressurized air column to form an air cushion within the ram to provide the desired ride cushion.

10 Claims, 9 Drawing Sheets

ADJUSTABLE AIR CUSHION BICYCLE SEAT

RELATED APPLICATIONS

This application is a continuation-in-part application of Provisional patent Application 60/416,822 filed Oct. 8, 2002 entitled "Adjustable Air Cushion Bicycle Seat."

BACKGROUND OF THE INVENTION

1. Field

This invention relates to adjustable bicycle seats. More particularly it relates to an adjustable bicycle seat hydraulically cushioned to absorb shocks during riding.

2. State of the Art

A number of bicycle seat adjustable height and shock absorbing systems are known. Zurfluh et al., U.S. Pat. No. 5,713,555 discloses a saddle support for a bicycle employing a gas cylinder and piston attached to the saddle to adjust the height of the saddle during riding. The gas cylinder elevates the piston during riding, which is then clamped into position to secure the saddle at a variable height. Once clamped, the compressed gas cylinder acts as a shock absorber to cushion the ride. Unfortunately, the more the piston is extended, the softer the ride as the gas volume increases resulting in reduced pressure resistance inside the gas cylinder. Becker, U.S. Pat. No. 5,829,733 discloses another adjustable height shock absorbing bicycle mounting assembly employing a gas spring system.

DeFreitas, U.S. Pat. No. 5,826,935 discloses another automatic bicycle seat adjuster for adjusting a bicycle seat's height while riding via a gas cylinder and spring system. This system sets the height of the bicycle, and uses a spring system to provide for a softer ride. Voigt, U.S. Pat. No. 5,383,705 provides a spring cushioned shock absorbing bicycle seat system. Massaro, U.S. Pat. No. 5,324,058 discloses a combination spring/fluid bath bicycle seat shock absorbing system mounted within the bicycle seat frame to cushion the ride. The ride is adjusted by varying the compression tension of the spring. Hartway, U.S. Pat. No. 5,094,424 discloses a bicycle seat post shock absorber assembly employing tubular mounted coil springs.

Cited for general interest are: Hale, U.S. Pat. No. 3,339,873 disclosing a stool with vertically movable seat employing a reciprocal piston rod containing air under pressure from a pressure tank to control the ascent and descent of the seat. Hale, U.S. Pat. No. 3,636,816 discloses a power unit mounted within the vertical post of a stool using a reservoir containing oil under pressure of compressed air which can be used to change the effective length of the seat.

SUMMARY OF THE INVENTION

The invention comprises an adjustable air cushion bicycle seat hydraulic ram system mounted within the seat post of a bicycle frame, having a hollow ram with one closed first end attached to the bicycle seat, and the other open second end of the ram slideably mounted within an internal reservoir positioned within the seat post such that the ram cap closes the internal reservoir. This internal reservoir is in communication with an external pressurized reservoir whose liquid level and quantity of air may be adjusted. Preferred liquids are lubricating oils that do not compress under pressure while minimizing sliding friction pressure of the ram. They also preferably maintain their viscosity over the operating range of the bicycle. Preferably, they contain fibers that aid in preventing seal leakage. A preferred oil is one that not only maintains its viscosity under normal conditions, but contains fibers, which minimizes O-ring leakage.

The first end of the ram extends sufficiently to position the bicycle seat at the desired height. If additional height is required with the ram in a fully extended position, an extender may be included between the end of the ram and the seat. The second end of the ram, when inserted, forms a variable sized internal reservoir, which is associated with the external pressurized air/liquid reservoir to selectively fill the internal reservoir with a pressurized air column of a desired height and volume to form an air cushion within the ram to provide the desired ride cushion. By varying the length and pressure of the air column therein, the ride cushion is adjusted. For example, the longer the column of air, the softer the ride; thereby requiring more air pressure to be injected to maintain the same ride. To minimize the size of the external pressurized air/liquid reservoir, generally more liquid is injected into the internal reservoir; thereby minimizing the amount of air resulting in a harder ride. Thus, either air and/or liquid may be selectively directed into the internal reservoir to maintain the desired ride.

The external pressurized air/liquid reservoir has a liquid fill port to adjust the volume and height of the liquid. After filling to a desired height, the fill port is closed and the air/liquid reservoir is pressured. As air is injected into the air/liquid reservoir, the air forces liquid into a fill tube and through a valve in communication with the internal reservoir forming a column of liquid therein. This continues until the level of the liquid in the pressurized air/liquid reservoir reaches the level of the fill tube so that thereafter the liquid level within the internal reservoir stays the same and the added air increases the pressure within the air column above. In the simplest embodiment, the fill tube is of fixed height and the level of the liquid and air pressure within the pressurized air/liquid reservoir is varied. In a more complex embodiment, the height of the fill tube may be elevated within the pressurized air/liquid reservoir to direct more or less liquid into the internal reservoir to provide the desired ride.

Where the pressurized air/liquid reservoir has limited capacity, it may have to be filled and pressurized again to provide sufficient liquid to fill the internal reservoir with the seat in the fully extended position. If too much liquid is added for the desired ride, the fill port is bled to adjust the air cushion column therein.

In one preferred embodiment, the invention comprises a first tube with sidewalls mounted within the seat post of the bicycle with an open end welded or secured to the top opening of the seat post. The first tube has a closed end vertically aligned within the seat post to form an impervious internal reservoir. A ram with sidewalls and an open end is slideably secured within the top of the first tube. It has a capped end and an open end, which forms an internal reservoir defined by the bottom of the first tube and between the sidewalls of the first tube and the ram. The sidewalls of the ram define channels in communication with this internal reservoir.

A sliding valve with a rim and corresponding flow channels is secured within the ram. It has an open end slideably mounted within the open end of the ram and a rim proximate the entry into the internal reservoir. The open end of the valve edge is thus in communication with the internal reservoir such that its closed end caps the internal reservoir forming a closed system into which fluids and air are secured within the valve and the sidewalls of the first tube and ram to form a liquid trap sliding seal, such as paired spaced apart O-rings. The sliding valve thus forms an open flow channel into the internal reservoir in the open position where fluids flow around the O-rings, and secures its edge against the O-ring to close the flow through the channels in the closed position. The amount of air and oil within the internal reservoir thus determines the amount of cushioning of the ride, which is initially set by the pressure within the pressurized reservoir mounted beneath the bicycle seat and increases thereafter with the weight of the rider pushing the seat down against the ram.

The extension of the top of the ram relative to the bike frame is secured in place by a knee system associated with the frame and seat of the bicycle. The knee system not only limits the extension of the seat, but prevents the seat from twisting during operation.

In another variation, the bicycle frame seat post may be adapted as a built-in reservoir. O-ring seals or other liquid seals may be employed with the valve using different types of gaskets. However, all of these valves and seals must be employed in a manner, which provides internal hydraulic resistance to the ram in the event of rapid loss of air pressure to prevent sudden jolts to the rider. Usually, the size of the channel orifices, oil viscosity, and valve restriction is selected to insure that adjustment is gradual.

As discussed above, the fill tube is in communication with the pressure air/liquid reservoir with a fill port. After the fill tube selectively fills the internal pressure reservoir with a liquid, such as oil and air under pressure to form an air cushion, the valve is usually closed so that the air cushion within the internal reservoir only affects the ride cushion. However, the valve could be left open so that the air columns in both the pressure air/liquid reservoir and internal pressure reservoirs affect the ride cushion. Thus, the amount of oil and air is controlled by valve means associated with the fill tube with structure to regulate the ratio of air and liquid entering the internal pressure reservoir. The extension and cushion of the seat is thus adjusted via an air liquid ratio to provide the desired height and ride cushion. Thus, a user does not have to add more oil or pressurized air to the external air/pressure reservoir to maintain the ride cushion. They may simply open the valves to select more air for delivery, raise the seat, and then close the valve to provide a higher volume of air to provide a more cushioned ride. Alternatively, if the user opens the valves to select more oil for delivery, a lesser column of air is provided for a harder ride. Thus a user can raise and lower the seat while varying the position of the valve to selectively determine the percentage ratios of oil and air to adjust the ride of the bicycle.

The invention thus provides a variable riding cushioned seat system readily adapted to the preferences of the rider.

DESCRIPTION OF THE DRAWINGS

FIG. 4b is a side view of the short knee shown in FIG. 4a

FIG. 5b is a top view of the long knee shown in FIG. 5a.

DESCRIPTION OF THE ILLUSTRATED EMBODIMENTS

Figure 1:
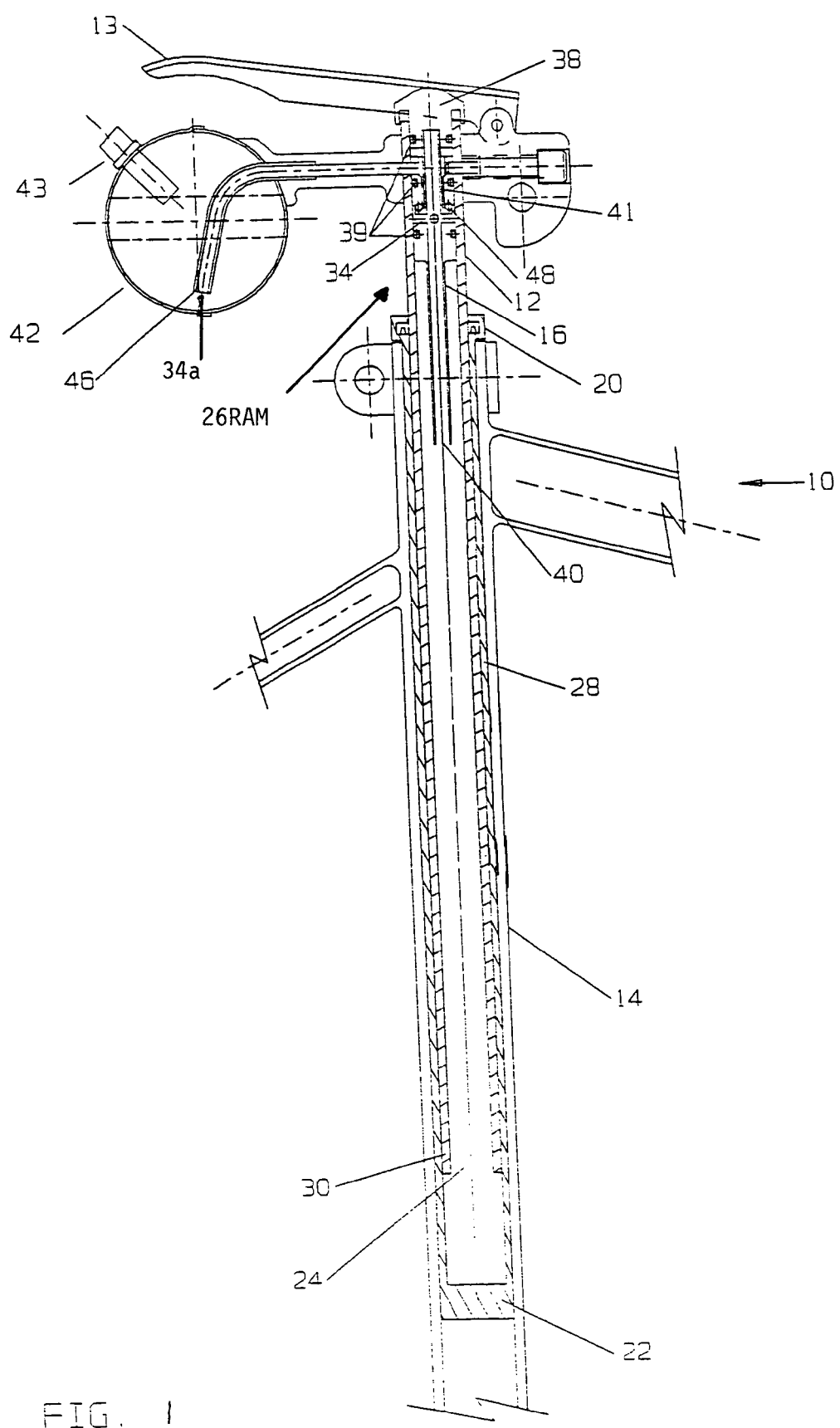
FIG. 1 is a cross section of one preferred embodiment of the invention.

FIG. 1 is a cross section of one preferred embodiment of the adjustable air cushion bicycle seat, which employs an hydraulic ram system 10 mounted within the seat post 12 receptacle segment of a bicycle frame 14. The ram system is comprised of an open ended tubular seat post 12 having an open end 30 surrounded by a sliding tubular extension 28 with a closed end 22 forming an internal reservoir 24. The seat post 12 and sliding tubular extension 28 are mounted within the open end 20 of the bicycle frame 14. The seat post 12 and extension 28 are thus secured within the open end 20 of the bicycle frame 14 to provide an hydraulic rain system, which extends the seat (not shown) to a desired height while providing a cushion of air/oil within the internal reservoir 24 to absorb road shocks. A sliding extension about the ram 26, not shown, may be associated with the ram 26 and seat such that the extension may be locked to extend the height of the seat.

The internal reservoir 24 is in communication with the valve tube 16 of a fill port valve 34, which determines the amount of oil and air under pressure entering the internal reservoir 24. The lever arm 13 of the fill port valve 34 is mounted under the seat mounting bracket 15 shown in FIG. 2a to enable manual control of the oil and air entering the internal reservoir 24.

Figure 2A:
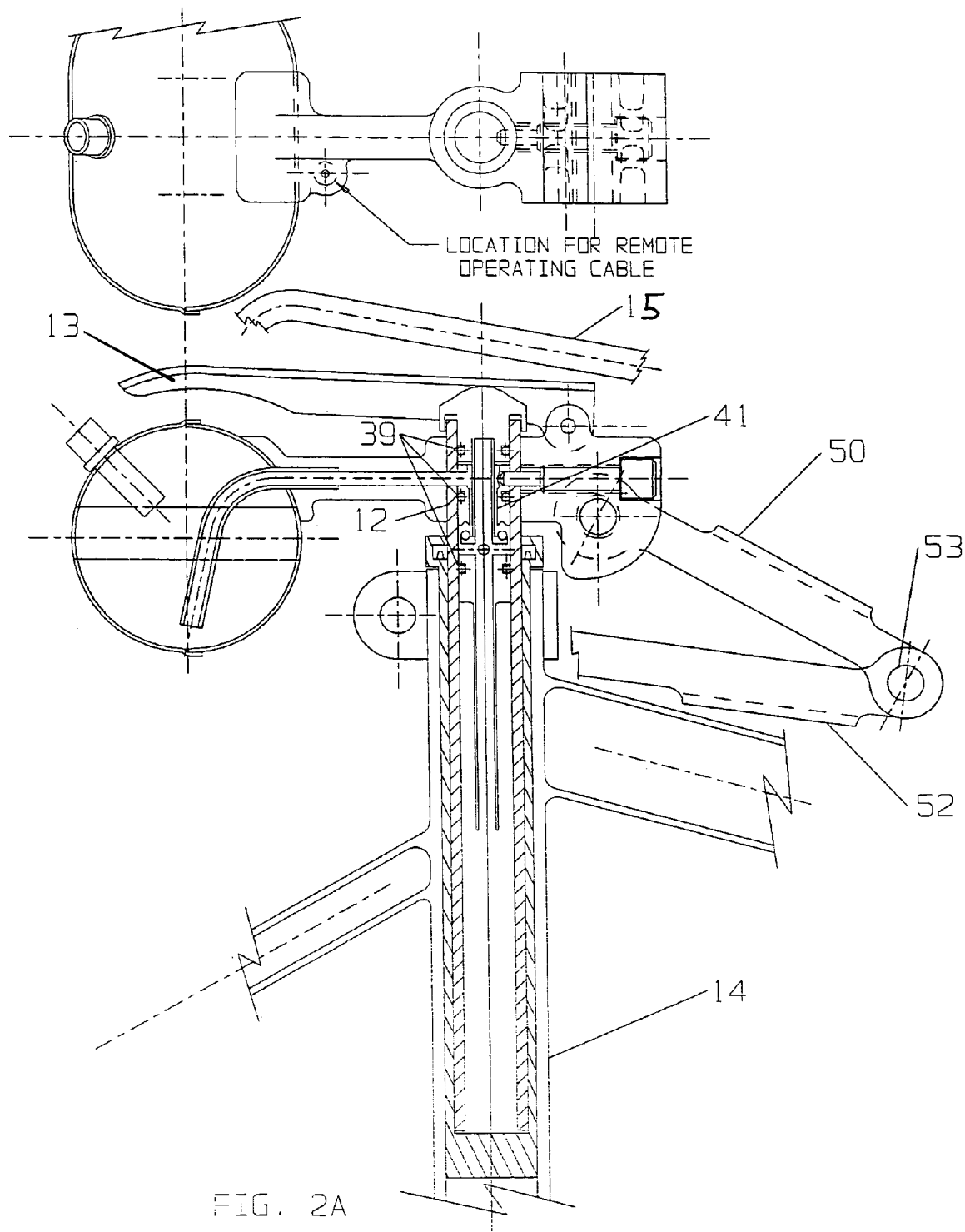
FIG. 2a is a cross section of the valve open and lowering the seat.
Figure 2B:
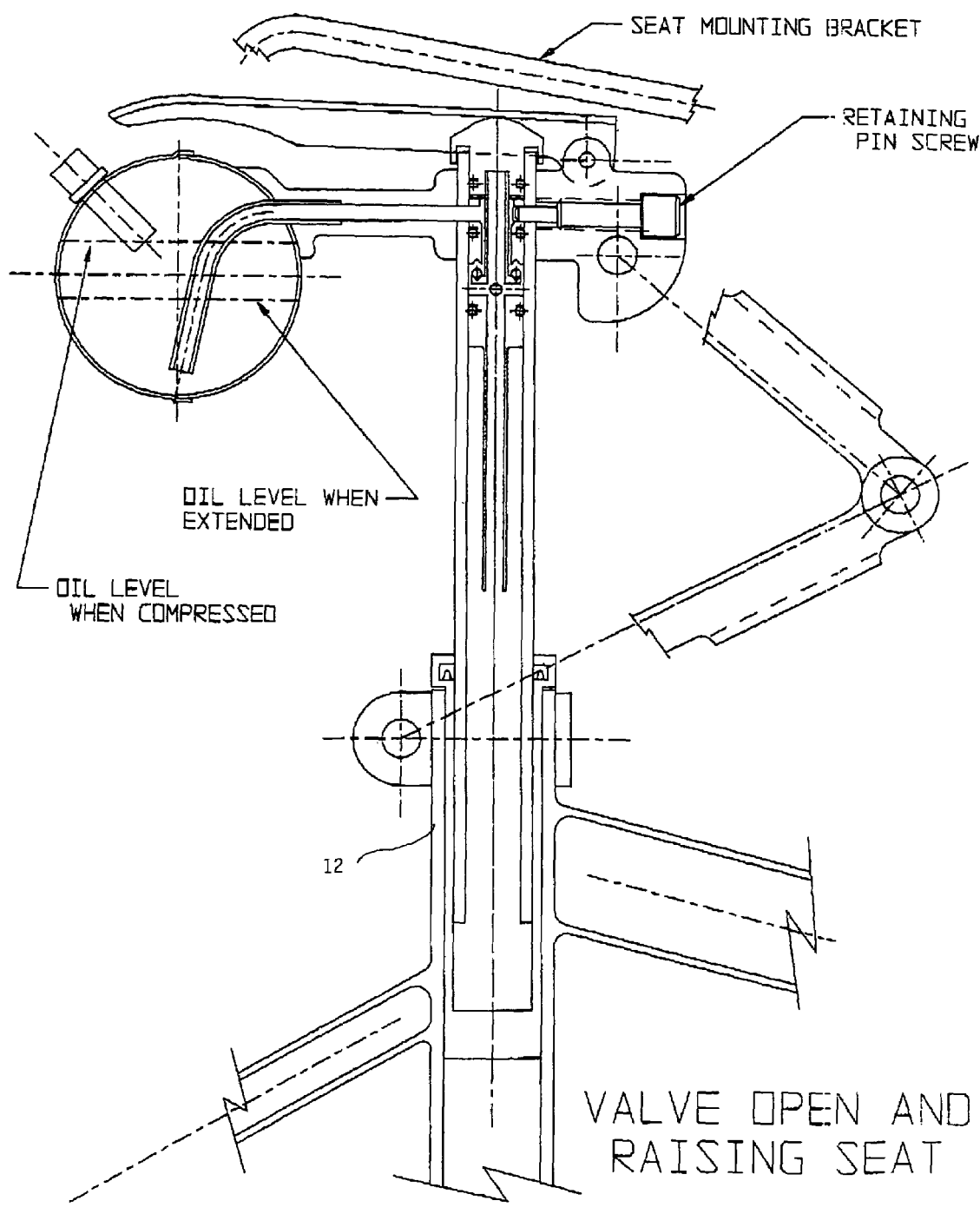
FIG. 2b is a cross section of the valve open and raising the seat.
Figure 2C:
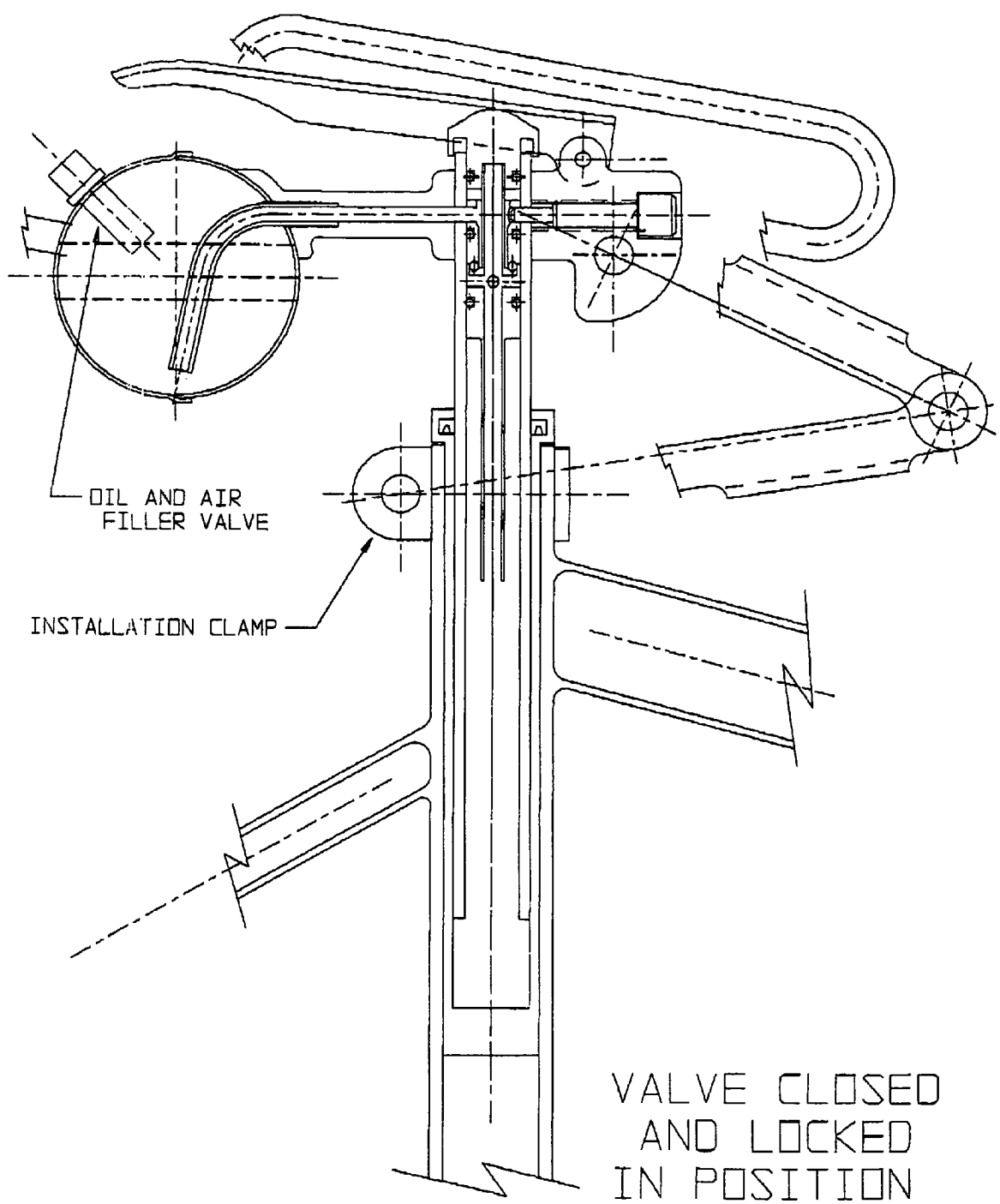
FIG. 2c is a cross section of the valve closed and locked in position.

The fill port valve 34 is mounted within the ram 26 with a closed end 38 secured to the seat mounting bracket 15. Its open end 40 is mounted within the ram 26 such that its open end 40 is in communication with the internal reservoir 24. When in place, the closed end 38 caps the internal reservoir 24 trapping therein fluids and air within the internal reservoir 24 via a liquid trap seal formed by pairs of O-rings 39 shown in FIGS. 2a, 2b, and 2c. FIG. 2a shows the fill port valve 34 open to lower the seat. FIG. 2b shows the fill port valve 34 open to raise the seat. FIG. 2c shows the fill port valve 34 closed in a locked position to maintain the seat position, which retains a column of cushion air within the ram 26.

Figures 2D, 2E:
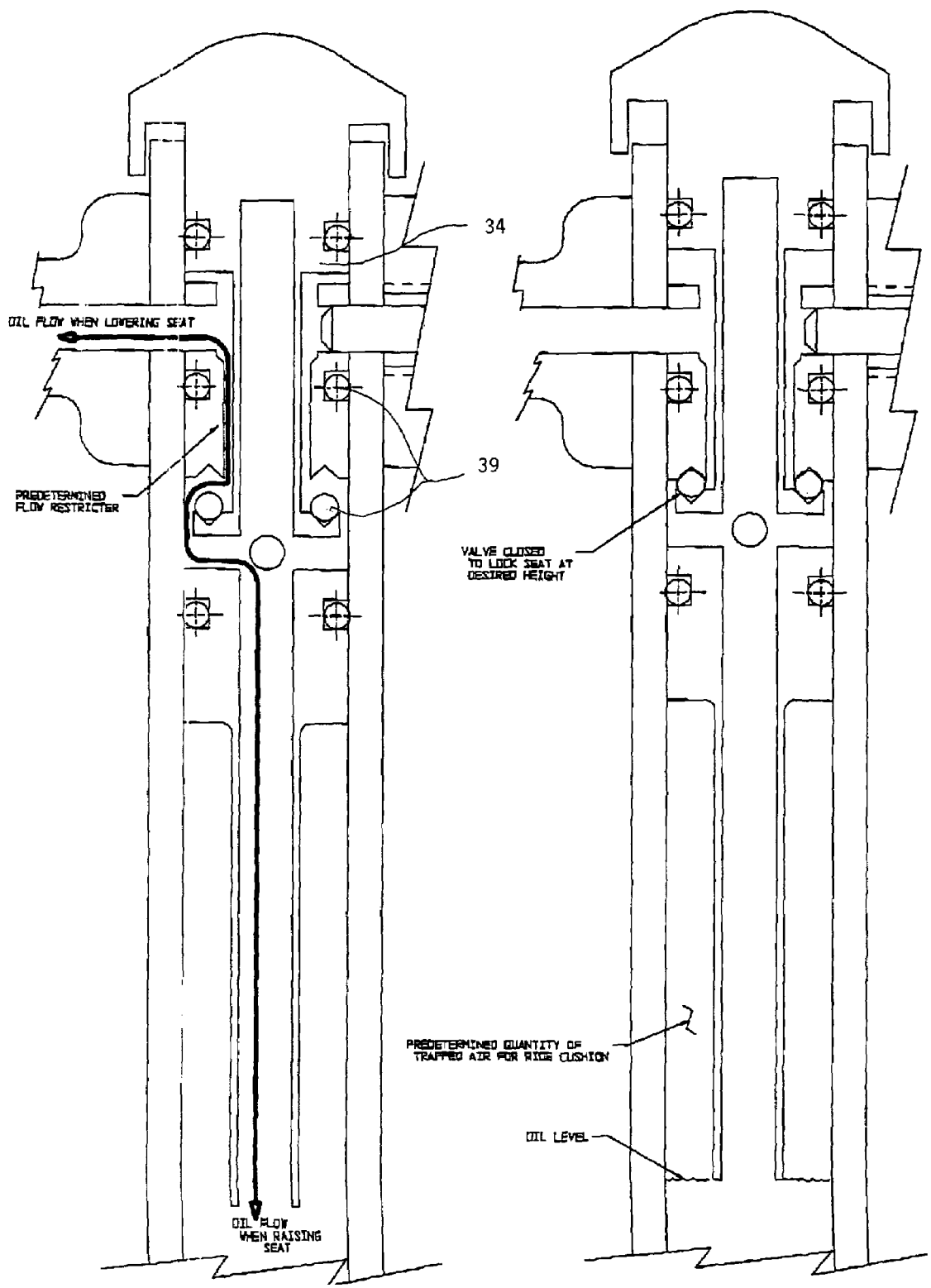
FIG. 2d is a cross section of the valve flow path in open position raising the seat.
FIG. 2e is a cross section of the valve flow path closed to lock the seat at the desired height.

The oil flow path with the fill port valve 34 open and closed is shown in FIGS. 2d and 2e. The channels 41 of the fill port valve 34 are sized to provide oil flow restriction to prevent a sudden raising or lowering of the ram 26 in the event of pressure loss.

A pressurized reservoir 42 is mounted beneath the bicycle seat in communication with the valve tube 16 and filled with oil and air under pressure via a fill port 43. The reservoir 42 is structured as a dual air/liquid phase settling reservoir to collect and remove foam from the internal reservoir by providing sufficient liquid surface area for the foam to coalesce into the liquid phase. An air hose nipple (not shown) is attached to the interior of the fill port 43 and in communication with the interior of the pressurized reservoir 24 so that increased air under pressure may be injected for a firmer ride. Alternatively, air may be released from the pressurized reservoir 42 via the fill port 43 for a softer ride. A fill tube 46 having a fill duct 34a is in communication with the pressurized reservoir 42 to selectively fill the internal reservoir 24 with oil and air under pressure to form an air cushion within the ram 26.

A set valve 48 may be included to seal off the pressurized reservoir 42 from the internal reservoir 24 so that the ride may be regulated by just the height of the air cushion within the internal reservoir 24.

Figure 3:
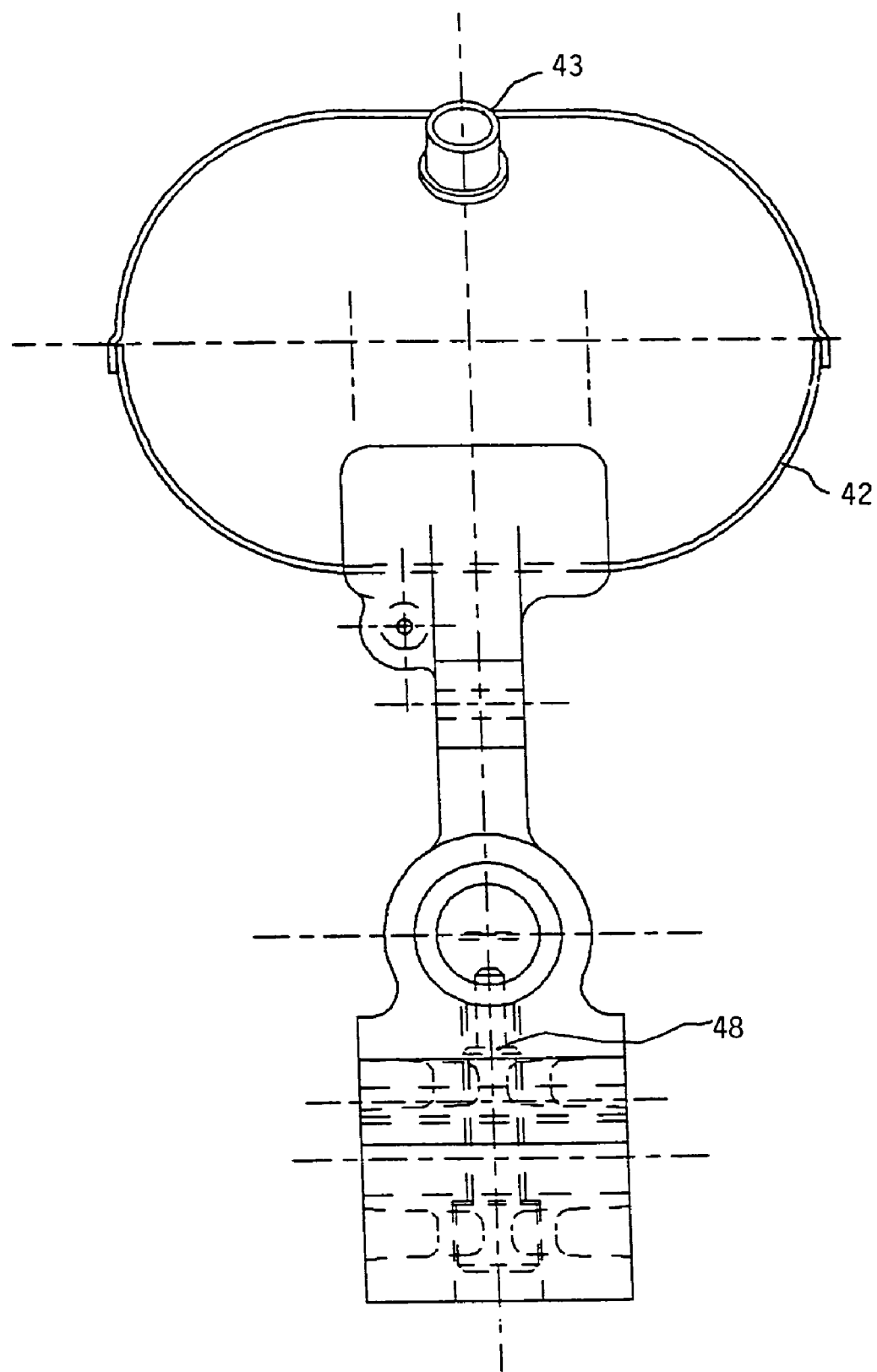
FIG. 3 is a top view of a pressurized reservoir and set valve.

FIG. 3 is a top view of the pressurized reservoir 42 and set valve 48.

Figure 4A:
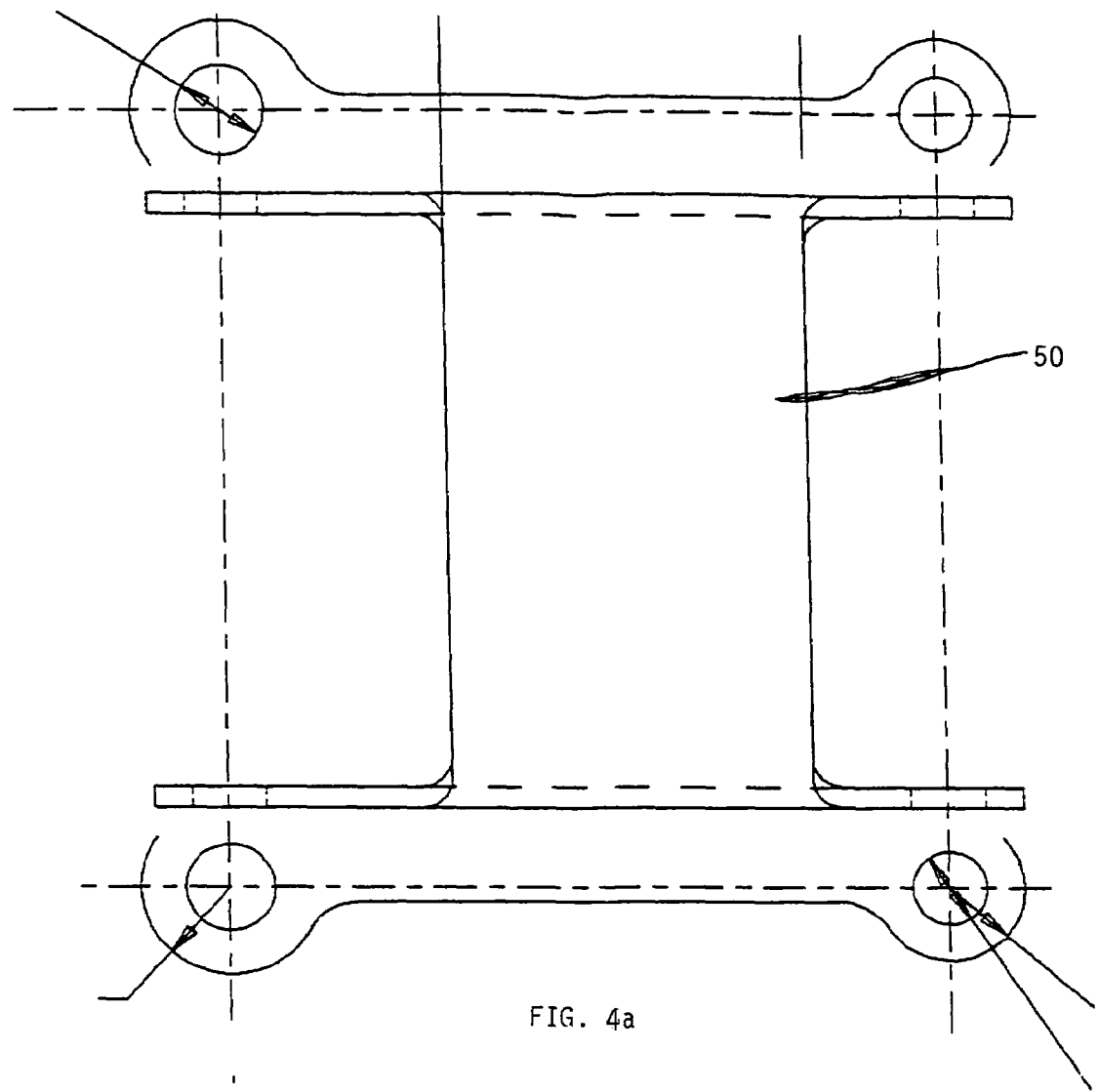
FIG. 4a is a top view of a short knee.
Figure 4B:
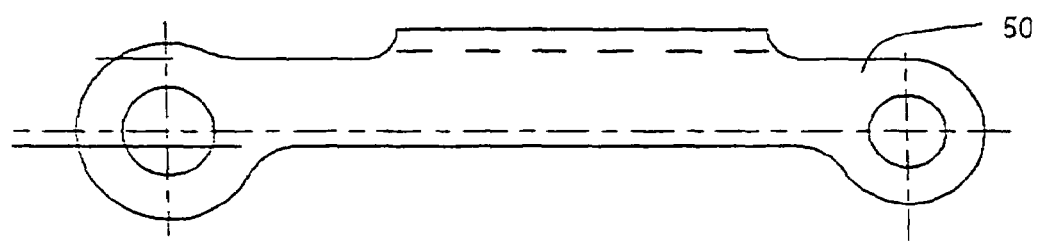
Figure 5A:
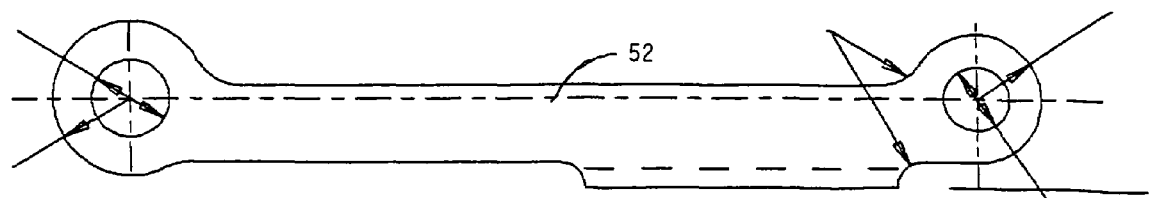
FIG. 5a is a side view of a long knee.
Figure 5B:
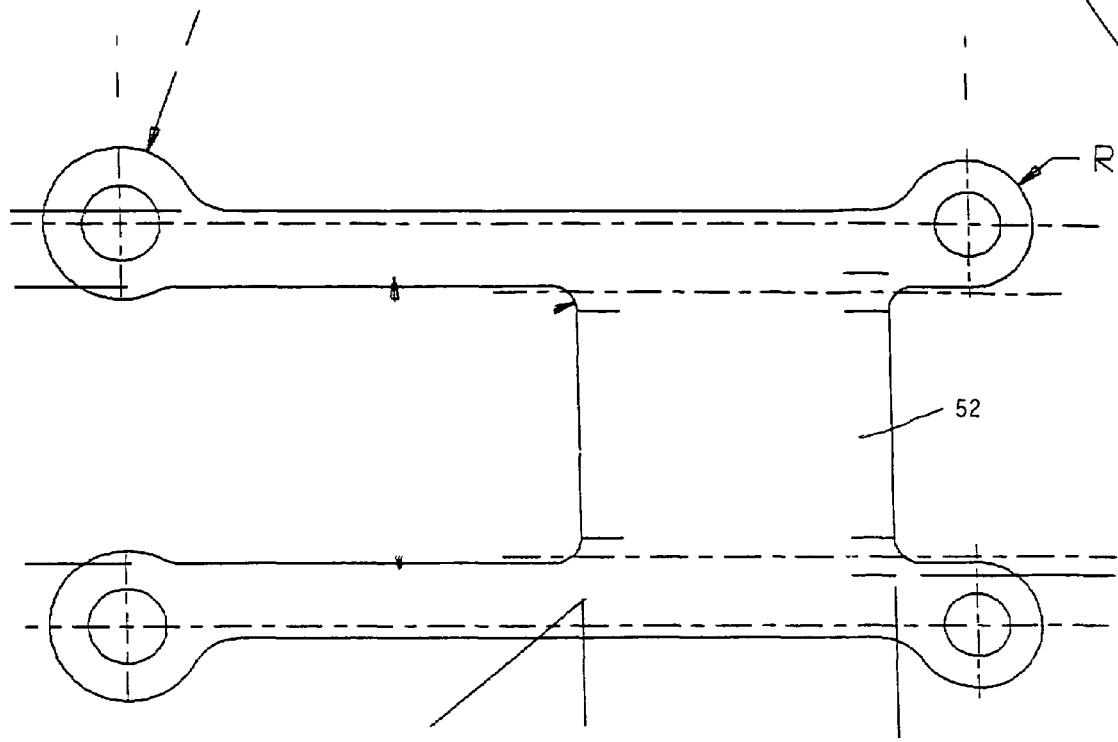

FIG. 4a is a top view of a short knee 50 attached to the base of the seat mounting bracket 15. FIG. 4b is a side view of the short knee 50 shown in FIG. 4a. FIG. 5a is a side view of a corresponding long knee 52 attached to the seat post 12 of the bicycle frame 14. FIG. 5b is a top view of the long knee shown in FIG. 5a. The short knee 50 is connected to the long knee 52 with a hinge pin 53 so that the seat mounting bracket 15 may extend up and down, but not twist.

Figure 6:
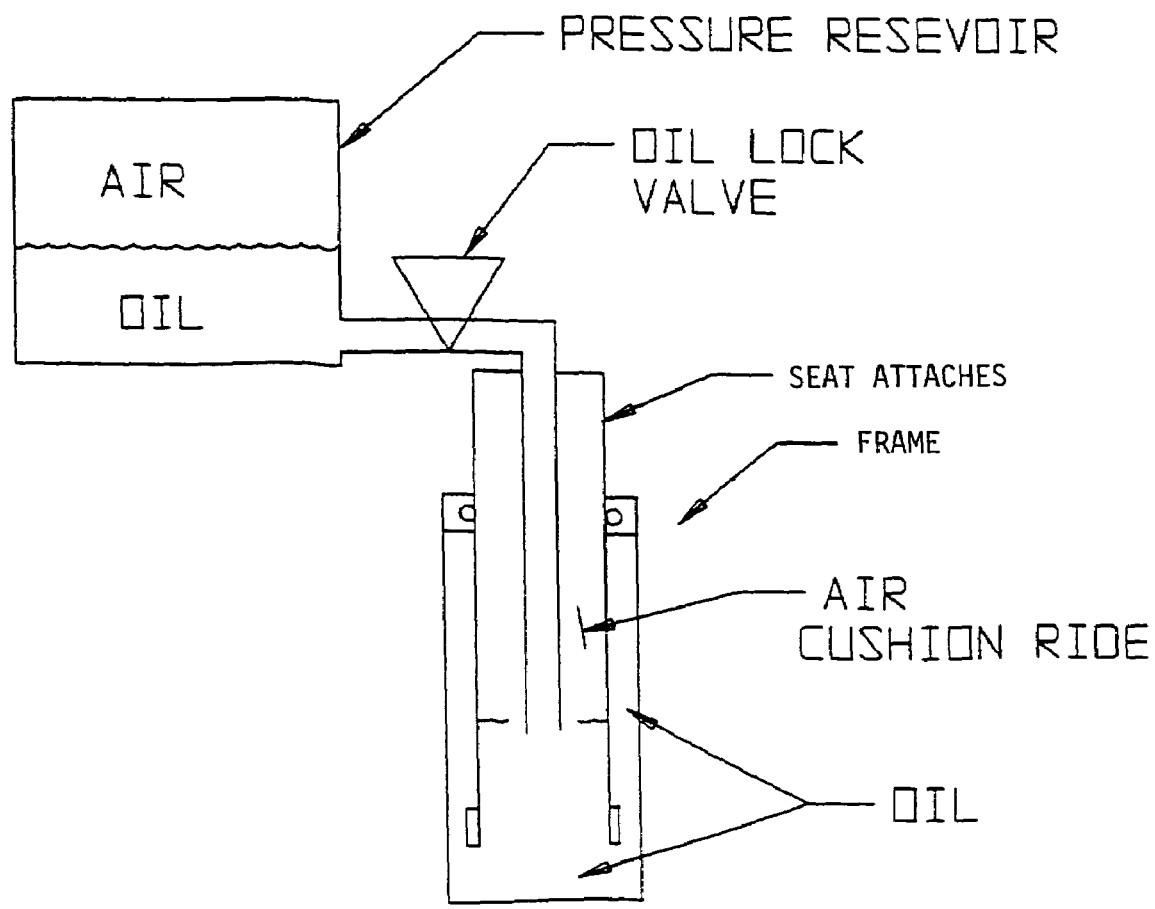
FIG. 6 is a schematic operating diagram of the preferred embodiment

FIG. 6 is a schematic overview of the adjustable air cushion bicycle seat showing how the pressurized reservoir 42 is selectively activated by the valve 34 to raise and lower the column of air within the internal reservoir 24 to adjust the ride. Thus, to adjust the seat height and ride, the valve is opened to select either pressurized air or oil to enter the ram 26 and internal reservoir 24. The seat is then raised or lowered, which draws in or forces out the desired air or oil combination to adjust the height of the air column within the internal reservoir 24. The set valve 48 may then be closed so that the ride is dependent solely upon the height of the air column within the internal reservoir 24. Alternatively, it may be left open to make the ride dependent upon the pressure within the pressurized reservoir 42 as well.

The invention 10 thus provides an adjustable bicycle seat with cushioned ride dependent upon an adjustable volume and pressure or air and liquid within the internal reservoir 24, which selectively determines the height of the air column within a ram system supporting the bicycle seat to absorb ride shock.

Although this specification has referred to the illustrated embodiments, it is not intended to restrict the scope of the appended claims. The claims themselves recite those features deemed essential to the invention.

I claim:

1. An adjustable air cushion bicycle seat hydraulic ram system mounted within the seat post of a bicycle frame, having:
   a. a hollow ram with one end attached to the bicycle seat and an open end,
   b. an internal bicycle frame reservoir with an open end secured to the seat post sized to accommodate the open end of the ram slideably sealed in the internal bicycle frame reservoir open end to create an enclosed pressurized liquid/air column within the internal bicycle frame reservoir,
   c. a valve with walls defining channels in communication and located between the internal bicycle frame reservoir wherein the thickness of the valve walls and size of the wall channels and the liquid are selected to provide hydraulic flow resistance to delay the response of the ram to rapid changes in the internal bicycle frame reservoir pressure to prevent abrupt extension or contraction of the ram mounted seat to shock to the rider, and
   d. an adjustable pressurized air/liquid reservoir having filling means to selectively fill the air/liquid reservoir such that the valve adjusts the height, volume, and pressure of the air and liquid columns within the internal bicycle frame reservoir to form a desired air cushion within the ram to provide the desired ride cushion.

2. An adjustable air cushion bicycle seat hydraulic ram system according to claim 1, wherein the valve may open in communication with the adjustable pressured air/liquid reservoir such that the air cushion ride is also dependent on the pressure and volume of air and liquid in the pressurized air/liquid reservoir as well as that in the internal bicycle frame reservoir.

3. An adjustable air cushion bicycle seat hydraulic ram system according to claim 1, including a ram with a sliding tubular extension slideably attached about the ram such that the extension may be moved and locked thereto to provide a desired length extension to the ram with another end attached to the seat to elevate the seat to a desired height when the internal reservoir is filled and positioned to provide the desired ride cushion.

4. An adjustable air cushion bicycle seat hydraulic ram system according to claim 1, including a mounting knee with one end attached to the bicycle seat post and the other end attached to the seat to limit the extension of the ram and prevent twisting of the seat.

5. An adjustable air cushion bicycle seat hydraulic ram system according to claim 1, wherein the valve comprises a capped open tube with a rim and sidewalls defining flow channels slideably mounted about the ram such that the flow channels lead into the interior of the internal reservoir when the tube is in an open position, and are closed when the tube moves to position the rim to obstruct the flow channels in a closed position.

6. An adjustable air cushion bicycle seat hydraulic ram system according to claim 1, including a set valve associated with the adjustable pressurized air/liquid reservoir to isolate the internal reservoir from the pressurized reservoir to maintain a pre-selected pressure and volume of air and liquid in the internal reservoir.

7. An adjustable air cushion bicycle seat hydraulic ram system according to claim 1, wherein the pressurized reservoir is sized to hold sufficient liquid to fill the interior of the ram, when fully extended.

8. An adjustable air cushion bicycle seat hydraulic ram system according to claim 1, wherein the adjustable pressurized air/liquid reservoir is structured as a dual air/liquid phase settling reservoir to collect and remove foam from the internal reservoir by providing sufficient liquid surface area for the foam to coalesce into the liquid phase.

9. An adjustable air cushion bicycle seat hydraulic ram system according to claim 1, wherein the liquid is a lubricating oil with fibers adapted to maintain viscosity over the temperature operating range of the bicycle and minimize leakage as the ram moves.

10. An adjustable air cushion bicycle seat hydraulic ram system mounted within the seat post of a bicycle frame, having:
   a. a hollow ram with one end attached to the bicycle seat and an open end,
   b. an internal bicycle frame reservoir with an open end secured to the seat post sized to accommodate the open end of the ram slideably sealed thereto to create an enclosed pressurized oil/air column,
   c. a pressurized air/oil reservoir in communication with the pressurized oil/air column, and
   d. valve means associated with a fill tube ducting system connecting and in communication with the pressurized air/oil reservoir and internal bicycle frame reservoir to control the pressure and volume of air and liquid directed into the internal bicycle frame reservoir to selectively fill and adjust the height, volume, and pressure of the air and oil columns within the internal bicycle frame reservoir to form the desired air cushion within the ram to provide the desired ride cushion;

e. injection means in communication with the pressurized air/oil reservoir to vary the amount, and pressure of air and liquids contained therein, f. a sliding extension associated with the ram and seat such that the extension may be locked to the ram to extend the seat to a desired height when the internal reservoir is filled and positioned to extend the ram to provide the desired ride cushion, and g. a mounting knee with one end attached to the bicycle seat post and the other end attached to the seat to limit the extension of the ram and prevent twisting of the seat.

* * * * *

UNITED STATES PATENT AND TRADEMARK OFFICE
CERTIFICATE OF CORRECTION

PATENT NO. : 7,025,367 B2
APPLICATION NO. : 10/681839
DATED : April 11, 2006
INVENTOR(S) : Paul G. McKinnon It is certified that error appears in the above-identified patent and that said Letters Patent is hereby corrected as shown below:

In Claim 1, Column 5, line 3, the term "having" is changed to --comprising--

In Claim 10, Column 6, line 3, the term "having" is changed to --comprising--

Signed and Sealed this

Nineteenth Day of September, 2006

JON W. DUDAS
*Director of the United States Patent and Trademark Office*